(12) United States Patent
Andrews et al.

(10) Patent No.: US 12,399,727 B2
(45) Date of Patent: Aug. 26, 2025

(54) INTERFACE WORKDAY ADAPTION FOR AN INFORMATION HANDLING SYSTEM

(71) Applicant: Dell Products L.P., Round Rock, TX (US)

(72) Inventors: Maxwell S. Andrews, Kennett Square, PA (US); Jyoti Jasmine Luu, Austin, TX (US); Jaegeon Park, Opelika, AL (US); Erik Summa, Lockhart, TX (US); David O. Garner, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/423,238

(22) Filed: Jan. 25, 2024

(65) Prior Publication Data
US 2025/0245026 A1    Jul. 31, 2025

(51) Int. Cl.
*G06F 9/451*    (2018.01)
*G06F 40/40*    (2020.01)

(52) U.S. Cl.
CPC .............. *G06F 9/451* (2018.02); *G06F 40/40* (2020.01)

(58) Field of Classification Search
CPC ................................. G06F 9/451; G06F 40/40
See application file for complete search history.

(56) References Cited

U.S. PATENT DOCUMENTS

| | | | |
|---|---|---|---|
| 9,311,020 B2 * | 4/2016 | Reohr | G06F 3/0611 |
| 9,565,158 B1 * | 2/2017 | Cooley | H04W 12/03 |
| 9,600,849 B2 * | 3/2017 | Ebner | G16H 40/20 |
| 9,697,820 B2 * | 7/2017 | Jeon | G10L 13/047 |
| 10,225,285 B2 * | 3/2019 | Bailloeul | G06Q 10/06 |
| 10,497,365 B2 * | 12/2019 | Gruber | G10L 15/28 |
| 10,521,466 B2 * | 12/2019 | Bellegarda | G06F 3/16 |
| 10,623,370 B1 * | 4/2020 | Ambareesh | H04L 61/5007 |
| 10,735,905 B2 * | 8/2020 | Gross | H04W 4/40 |
| 11,070,949 B2 * | 7/2021 | Gross | H04W 4/50 |
| 11,120,639 B1 * | 9/2021 | Smith | G06F 3/011 |
| 11,928,498 B2 * | 3/2024 | Iyer | G06F 9/4856 |
| 12,099,971 B2 * | 9/2024 | Bergamo | G06F 16/21 |
| 2007/0124737 A1 * | 5/2007 | Wensley | G06F 9/546 |
| | | | 719/314 |

(Continued)

*Primary Examiner* — William Lu
(74) *Attorney, Agent, or Firm* — Norton Rose Fulbright US LLP

(57) ABSTRACT

Systems and methods described herein may reconfigure a virtual workspace displayed to a user based on monitored contextual information pertaining to the virtual workspace. The system may reconfigure the virtual workspace by determining, based on the contextual information, a set of probability values associated with configuration settings that affect the virtual workspace, comparing the probability values to activation and deactivation probability thresholds, and activating or deactivating configuration settings based on the comparisons between the probability values and probability thresholds. Configuration settings may control whether particular applications are opened and displayed on the virtual workspace. By reconfiguring the virtual workspace based on contextual information, the system may provide a seamlessly focused application interaction experience for a user from one contextual environment to the next on a single device.

20 Claims, 8 Drawing Sheets

(56) References Cited

U.S. PATENT DOCUMENTS

| | | | |
|---|---|---|---|
| 2012/0023223 A1* | 1/2012 | Branch | G06F 9/4856 |
| | | | 709/224 |
| 2012/0311583 A1* | 12/2012 | Gruber | G06Q 10/06316 |
| | | | 718/100 |
| 2013/0091543 A1* | 4/2013 | Wade | G06F 21/53 |
| | | | 726/1 |
| 2015/0179186 A1* | 6/2015 | Swierk | G10L 25/60 |
| | | | 704/276 |
| 2016/0364668 A1* | 12/2016 | Young | G06Q 10/06313 |
| 2017/0357716 A1* | 12/2017 | Bellegarda | G06F 16/345 |
| 2018/0365309 A1* | 12/2018 | Oliner | G06F 9/542 |
| 2019/0147024 A1* | 5/2019 | Anders | H04L 63/102 |
| | | | 715/753 |
| 2020/0317241 A1* | 10/2020 | Carlson | B61L 25/021 |
| 2020/0404573 A1* | 12/2020 | Athlur | H04W 4/06 |
| 2021/0389999 A1* | 12/2021 | Malireddi | G06Q 10/10 |
| 2023/0205803 A1* | 6/2023 | Frieder | G06V 40/172 |
| | | | 709/204 |
| 2023/0205804 A1* | 6/2023 | Frieder | H04N 21/234372 |
| | | | 709/204 |
| 2023/0245651 A1* | 8/2023 | Wang | G06N 5/022 |
| | | | 704/275 |
| 2023/0360388 A1* | 11/2023 | Singh | G06V 30/10 |
| 2023/0367973 A1* | 11/2023 | Konam | G06F 40/40 |
| 2023/0409298 A1* | 12/2023 | Ciminelli | G06V 30/422 |
| 2024/0095682 A1* | 3/2024 | Lightbody | G06Q 10/1095 |

\* cited by examiner

INTERFACE WORKDAY ADAPTION FOR AN INFORMATION HANDLING SYSTEM

FIELD OF THE DISCLOSURE

The instant disclosure relates to information handling systems. More specifically, portions of this disclosure relate to dynamic reconfiguration of user interfaces in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems serve many varied functions across many personal roles. For example, business, personal, family, and entertainment activities frequently occur on a single personal electronic device, depending on the time, location, and user context. Unfortunately, this general-purpose utility tends to muddle together these activity streams within the user interface. This creates not only a cluttered and overwhelming experience for users which is poorly attuned to any particular context, but also invites data privacy and security issues between work and personal applications and content. It also provides ample opportunity for distractions to creep in during focused activities.

SUMMARY

According to aspects of this disclosure, information handling systems may execute applications and may be configured to display interfaces associated with the applications to a user in a virtual workspace. A virtual workspace may be reconfigured based on monitored contextual information pertaining to the virtual workspace and/or to the information handling system displaying the virtual workspace, thereby providing a seamlessly focused application interaction experience for a user from one contextual environment to the next on a single device.

Using some existing systems, a user may create a plurality of profiles on a device. In such systems the user may customize settings particular to each profile such that different profiles suit different contextual environments (e.g., work profile, personal profile). However, in such a system the user must maintain awareness of their current contextual environment themselves and manually navigate between different profiles when their contextual environment changes. Additionally, using some existing techniques, a user may configure a first device to suit a first contextual environment (e.g., work device) and configure a second, different device to suit a second, different contextual environment (e.g., personal device). However, such techniques require the user to maintain two separate devices and also to maintain awareness of their current contextual environment themselves and manually switch between devices when their contextual environment changes.

Shortcomings mentioned here are only representative and are included to highlight problems that the inventors have identified with respect to existing information handling systems and sought to improve upon. Aspects of the information handling systems described below may address some or all of the shortcomings as well as others known in the art. For example, in contrast to the existing systems described above, embodiments of this disclosure may employ contextual-based reconfiguration of virtual workspaces to obtain benefits such as reducing this number of devices. Aspects of the improved information handling systems described below may present other benefits than, and be used in other applications than, those described above.

In one embodiment, a user uses the same digital device(s) across personal and business activities, such that entertainment, browsing, personal and business communicates are commingled between and within various applications. This can create information security and privacy risks as business and personal data may leak across and within applications. This can also result in a confusing and distracting user experience as users must manually navigate between business and work content, or spend time creating a dedicated workspace such as a virtual desktop environment. Using aspects of the embodiments presented herein, the user interface environment changes over time to dynamically filter applications and content according to the current operating mode of the user. For example, in the morning hours, the user interface may surface news content along with a mix of personal and business appointments and goals scheduled for the day. As the user transitions from morning into workday, the interface may suppress news and personal content, replacing these elements with business-focused content such as recently-accessed business content, granular business tasks, and relevant appointments and communications. As the workday ends, the interface may suppress all business content and applications, replacing them with personal and family content including community news, suggested recipes, family communications, and entertainment. In the later evening, the interface may become optimized for entertainment content, such as streaming video services, and suppress all other content.

Additional data about the environment in which a user is located can help customize the content to best fit a user's needs. For example, when a user connects to a work network, work content can be surfaced, and when a user is connected to a personal network, personal content can be surfaced. Similarly, when connected to public networks like when a user is at an airport or coffee shop, the user's sensitive data can be hidden, and they can be prompted to use a VPN.

Furthermore, the medium in which content is displayed can be customized to fit each user's preferred method of consumption. For example, one user may prefer to listen to their latest emails and updates like a podcast while another user may prefer to watch snippets of the related content in short-form video format.

According to one embodiment, a method for execution by an information handling system includes receiving context data pertaining to a virtual workspace and reconfiguring the virtual workspace, whereby reconfiguring the virtual workspace includes: determining a plurality of probability values each associated with a configuration setting of a plurality of configuration settings of the virtual workspace, wherein each of the plurality of probability values represents a likelihood that the associated configuration setting should be active based on the context data; modifying the plurality of probability values based on one or more preference settings to generate a plurality of modified probability values; comparing, by the information handling system, each of the plurality of modified probability values associated with configuration settings of the plurality of configuration settings that are presently inactive to a first probability threshold; comparing, by the information handling system, each of the plurality of modified probability values associated with configuration settings of the plurality of configuration settings that are presently active to a second probability threshold that is lesser in magnitude than the first probability threshold; activating, by the information handling system, the configuration settings that are presently inactive that are also associated with probability values of the plurality of modified probability values that are greater than the first probability threshold; and deactivating, by the information handling system, the configuration settings that are presently active that are also associated with probability values of the plurality of modified probability values that are less than the second probability threshold.

In certain embodiments, determining the plurality of probability values each associated with a configuration setting may be performed using a classification algorithm that receives the context data in the form of one or more feature vectors. In some embodiments, the classification algorithm may be implemented using a support vector machine (SVM).

In certain embodiments, determining the plurality of probability values each associated with a configuration setting may be performed using a large language model (LLM) that may receive the context data in the form of one or more context embeddings.

In some embodiments, activating the configuration settings may include opening one or more applications, and deactivating the configuration settings may include closing one or more applications.

In certain embodiments, reconfiguring the virtual workspace may be performed in response to one or more discrete events without direct prompting by a user. In some embodiments, one or more of the discrete events may be defined based on the time of day. In some embodiments, one or more of the discrete events may be defined based on one or more entries in a virtual calendar.

In some embodiments, the context data may include environment data, device data, peripheral data, application telemetry data, or a combination thereof.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
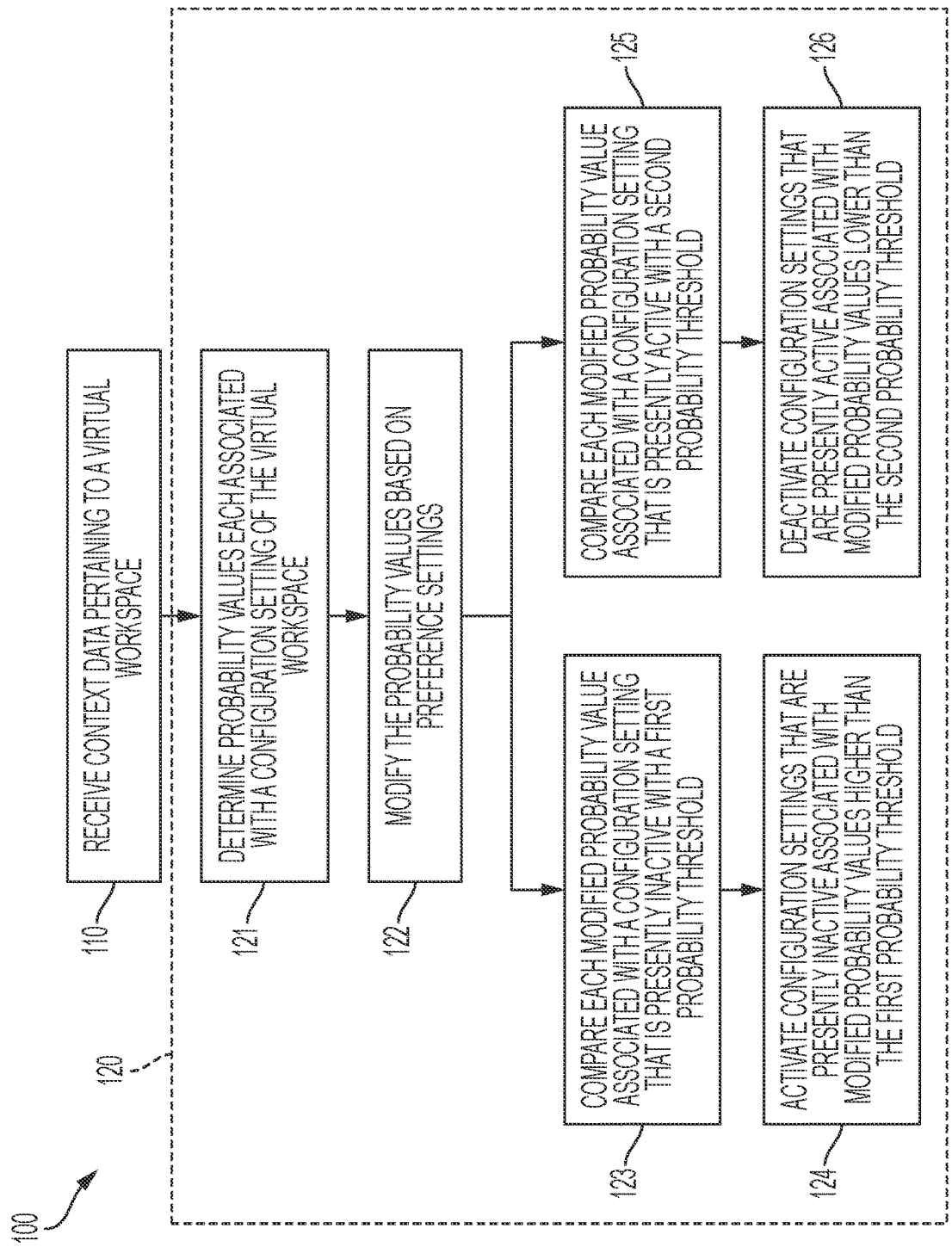
FIG. 1 is an operational flow diagram illustrating a method of reconfiguring a virtual workspace based on context data according to some embodiments of the disclosure.

FIG. 1 is a flow chart illustrating a method 100 of reconfiguring a virtual workspace based on context data pertaining to the workspace. Method 100 may be implemented by an information handling system, such as system 800 described below. Method 100 may begin at block 110 with an information handling system receiving context data pertaining to a virtual workspace displayed on the information handling system. In some embodiments, context data may include environment data, device data, peripheral data, application telemetry data, or a combination thereof. Environment data may include, but is not limited to, the time of day at which virtual workspace is being used, the geographic location at which the information handling system is located on which the virtual workspace is being displayed, entries in a user's virtual calendar (e.g., videoconference appointments, teleconference appointments, entries of tasks to be completed), the identity of network(s) to which the information handling system is connected while displaying the virtual workspace (e.g., work network, home network), or a combination thereof. Device data may include, but is not limited to, specifications of the information handling system on which the virtual workspace is displayed (e.g., display resolution, random access memory (RAM) capacity). Peripheral data may include, but is not limited, inputs from a mouse, keyboard, microphone (e.g., voice commands to the information handling system, voice cues identified while a user is on a video call), camera (e.g., whether a camera aperture is uncovered), speaker (e.g., whether a speaker volume is set to high, low, or off), display (e.g., touch screen gesture inputs, display brightness and contrast settings), ambient light sensor (ALS) (e.g., whether the user has the lights on or off, whether the user is using the virtual workspace indoors or outdoors, relative time of day based on ambient sunlight), inertial measurement unit (IMU)/Compass (e.g., orientation of the information handling system on which the virtual workspace is displayed), or a combination thereof. Application telemetry data may include, but is not limited to, a history of applications accessed by a particular user, a duration of use of a particular application, frequency of uses of a particular application, times of day when a particular application is opened or closed, notification settings for a particular application (e.g., whether a user has muted notifications form a particular application), device settings (e.g., whether a user has muted notifications for all applications), or a combination thereof.

At block 120, an information handling system may reconfigure the virtual workspace. In some embodiments, reconfiguring the virtual workspace may be implemented as illustrated in blocks 121-126.

At block 121, the information handling system may determine a plurality of probability values each associated with one of a plurality of configuration settings of the virtual workspace. Configuration settings may include, but are not limited to, activation status of one or more application(s) (i.e., whether one or more application(s) is active and running on the information handling system), display status of one or more application(s) (i.e., whether one or more interface(s) for one or more particular application(s), such as one or more widget(s) associated with one or more particular application(s), is/are displayed in the virtual workspace), one or more virtual workspace interface setting(s) (e.g., whether notifications from one or more application(s) displayed/active on the virtual workspace are muted, whether the virtual workspace interface is displayed having a "night mode" dark background), or a combination thereof. A single configuration setting may be associated with one application/virtual workspace interface setting or a plurality of applications/virtual workspace interface settings.

Each probability value of block 121 may represent a likelihood that the associated configuration setting should be active based on received context data. For example, in one embodiment, when context data is received that includes information that the time of day is morning, probability values may be determined to be higher for configuration settings that a user would likely desire to be active in the morning. In one example user, morning application preferences may include news application(s), calendar application(s) filtering a mix of personal and business appointments and tasks for the day. Then, in response to received context data that the time of day is transitioning from morning into the user's workday, probability values may be determined to be higher for configuration settings valuable for work activities (e.g., business-focused application(s), such as word processors, recently accessed business documents, calendar application(s) filtering to display business-focused appointments and/or tasks) and probability values determined to be lower for configuration settings less valuable for work (e.g., news application(s), calendar application(s) filtering to display personal appointments/tasks). And, in response to received context data that the time of day is transitioning out of a user's workday and into evening, probability values may be determined to be higher for configuration settings preferred for personal time (e.g., web browser application(s) active and displaying homelife-oriented content such as potential recipes, instant message application(s) filtering to display personal messages such as from family/friends, entertainment application(s)) and determined to be lower for configuration settings valuable for work activities.

As another example, in some embodiments, when context data is received that the information handling system is connected to a work network, probability values for configuration settings valuable for work activities (e.g., business-focused application(s), such as word processors, recently accessed business documents, calendar application(s) filtering to display business-focused appointments and/or tasks) may be determined to be higher and probability values for configuration settings preferred for personal activities (e.g., calendar application(s) filtering to display personal appointments/tasks, web browser application(s), instant message application(s) filtering to display personal messages such as from family/friends, entertainment application(s)) may be determined to be lower. Further, when context data is received that the information handling system is connected to a personal network, probability values for configuration settings preferred for personal activities may be determined to be higher and probability values for configuration settings valuable for work activities may be determined to be lower. As yet another example, in some embodiments, when context data is received that the information handling system is connected to a public network, configuration settings related to sensitive data (e.g., displaying content including confidential, proprietary, or personal information on the virtual workspace) may be determined to be lower and configuration settings related to network security (e.g., displaying a suggestion to connect to a virtual private network (VPN)) may be determined to be higher.

In some embodiments, the information handling system may determine probability values based on user habits defined based, at least in part, on interrelationships between historical context data. For example, a set of historical context data may show that when a particular user has an imminent meeting entry on his or her virtual calendar, that user, historically, tends to set all notifications on mute, open a word processing application, open a web browser application, turn on a camera peripheral, and close a music streaming application. So, in some embodiments, given the above-described set of historical context data, in response to received current context data that a user has an imminent meeting on his or her virtual calendar, probability values associated with configurations settings for muting notifications, activating/displaying a word processing application, activating/displaying a web browser application, and activating a camera peripheral may be determined to be higher, whereas the probability value associated with a configuration setting for activating/displaying/playing a music streaming application may be determined to be lower. In some embodiments, the weight that historical context data holds when factored into the determining of probability values may be based on length and/or consistency of history (e.g., when a user has a shorter/less consistent history of closing a music streaming application when the user has an imminent meeting then the historical context data representing that habit may be factored less heavily into determining a probability value for the configuration setting of activating/displaying/playing the music streaming app in response to received context data of an imminent meeting entry on the user's virtual calendar).

At block 122, the information handling system may modify the plurality of probability values determined in block 121 based on one or more preference settings to generate a plurality of modified probability values. Preference settings may include, but are not limited to, user preferences/feedback (e.g., configuration settings manually set by the user to not be alterable without user-intervention regardless of any received context data or to be alterable without user-intervention only in response to specific context data scenario(s) set manually by the user), organizational policies (e.g., configuration settings manually set by the user's organization to not be alterable without special permissions regardless of any received context data or to be alterable without special permissions only in response to specific context data scenario(s) set by the organization), or a combination thereof. For example, in one embodiment, a user may set a preference by submitting feedback that the user never wants his or her camera peripheral activated unless done so manually by the user. So, in the above-described embodiment, regardless of any probability value determined at block 121 associated with a configuration setting for activating a camera peripheral, given the preference setting described above, the probability value associated with that configuration setting may be modified to a lower value (e.g., approaching zero) at block 122. As another example, in one embodiment, a user's organization (e.g., employer) may have a policy that no users in the organization are permitted to activate music streaming applications on their virtual workspace during working hours. So, in the above-described embodiment, regardless of any probability value determined at block 121, associated with a configuration setting for activating a music streaming application, given the preference setting described above, the probability value associated with that configuration setting may be modified to a lower value (e.g., approaching zero) at block 122 in response to context data that the current time of day is within the user's working hours.

As another example, preference settings may indicate how a particular user would prefer to receive content from one or more particular applications. Specifically, a user may set a preference for an email application to report recent email updates by dictating the content of recent emails or playing video clips of the content to the user as opposed to showing the content of the email updates in text form. In some embodiments, based on the above-described preference setting, a probability value associated with a configuration setting to activate an email application and display recent emails may be modified lower and probability value(s) associated with configuration settings to activate the email application and dictate the recent emails and/or playback the content in a video may be modified higher.

At block 123, the information handling system may compare each modified probability value generated in block 122 that is associated with a configuration setting that is presently inactive to a first probability threshold. At block 124, the information handling system may activate configuration settings that are presently inactive and that are also associated with modified probability values that are greater than the first probability threshold.

At block 125, the information handling system may compare each modified probability value generated in block 122 that is associated with a configuration setting that is presently active to a second probability threshold that is lesser in magnitude than the first probability threshold. At block 124, the information handling system may deactivate configuration settings that are presently active and that are also associated with modified probability values that are less than the second probability threshold.

As an example, in one embodiment, a news application may be presently active on the virtual workspace and a word processing application may be presently inactive on the virtual workspace. Then, in response to received context data that the time of day is consistent with the start of the user's workday, the information handling system may determine a probability value associated with the configuration setting of activating the news application that is lower (e.g. 0.1) and not altered by any preference settings, and determine a probability value associated with the configuration setting of activating the word processing application to open a recently accessed business document that is higher (e.g., 0.7) and not altered by any preference settings. Then, because the word processing application is presently inactive, the modified probability value (e.g., 0.7) associated with the configuration setting of activating the word processing application to open a recently accessed business document is compared to the first probability threshold (e.g., 0.5). Since the modified probability value (e.g., 0.7) associated with the configuration setting of activating the word processing application to open a recently accessed business document is greater than the first probability threshold (e.g., 0.5), the word processing application is activated (e.g., opened to display a recently accessed business document). Also, because the news application is presently active, the modified probability value (e.g., 0.1) associated with the configuration setting of activating the news application is compared to the second probability threshold (e.g., 0.2), which is less than the first probability value (e.g., 0.5). Since the modified probability value (e.g., 0.1) associated with the configuration setting of activating the news application is less than the second probability threshold (e.g., 0.2), the news application is deactivated (e.g., closed, hidden).

As described in the previous example, some embodiments in accordance with the disclosure provide for reconfiguring of a virtual workspace in response to one or more discrete events (e.g., particular times of the day, appointments or other entries in the user's virtual calendar, the information handling system connecting to a particular network or moving to a different geographic location) without direct prompting by a user. Such embodiments allow the user to navigate between contextual environments (e.g., work to personal, personal to work) without having to divert any portion of his or her attention from his or her activities to reconfigure the virtual workspace to better suit a new contextual environment. Also, embodiments in accordance with the present disclosure may be implemented on a single information handling system, thereby providing the user with a workspace adaptable for various contextual environments without the user having to expend the cost or effort to maintain multiple devices configured specifically for different contextual environments.

Some embodiments may include more than two probability thresholds and may define intermediate states for configuration settings in between active and inactive (e.g., three states defined as active and displayed, active and hidden, and inactive). In some embodiments, the probability thresholds may be manually entered by the user, set by information handling system based on fields manually completed by the user, set by the information handling system without any direct input by the user, or a combination thereof. In some embodiments, the probability thresholds may be static values. In other embodiments, the probability thresholds may vary dynamically based on at least a portion of the context data, at least a portion of the historical context data, preference settings, or a combination thereof.

Figure 2:
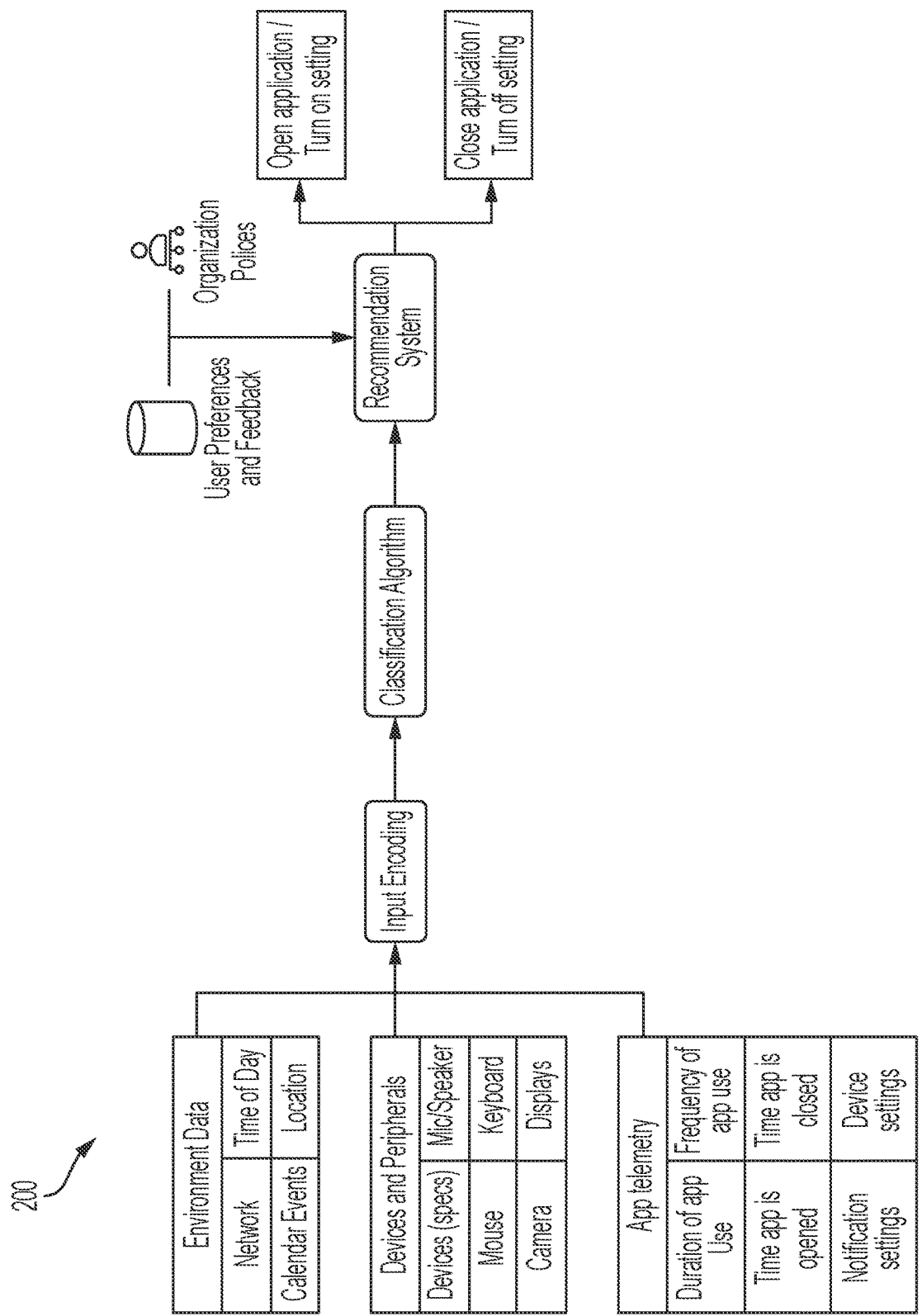
FIG. 2 is an operational flow diagram illustrating an implementation of a system configured to reconfigure a virtual workspace based on context data that utilizes a classification algorithm according to some embodiments of the disclosure.

A system 200 for executing the flow chart of FIG. 1 using a classification algorithm is shown in FIG. 2. Specifically, in some embodiments, a classification algorithm (e.g., a support vector machine (SVM)) may receive context data in the form of encoded inputs (e.g., feature vectors) and the probability values for each configuration setting may be determined based on those encoded inputs. Moreover, a recommendation system may modify the probability values determined by the classification algorithm based on preference settings (e.g., user preferences/feedback, organizational settings) to generate modified probability values to compare against two or more probability thresholds.

Figure 3:
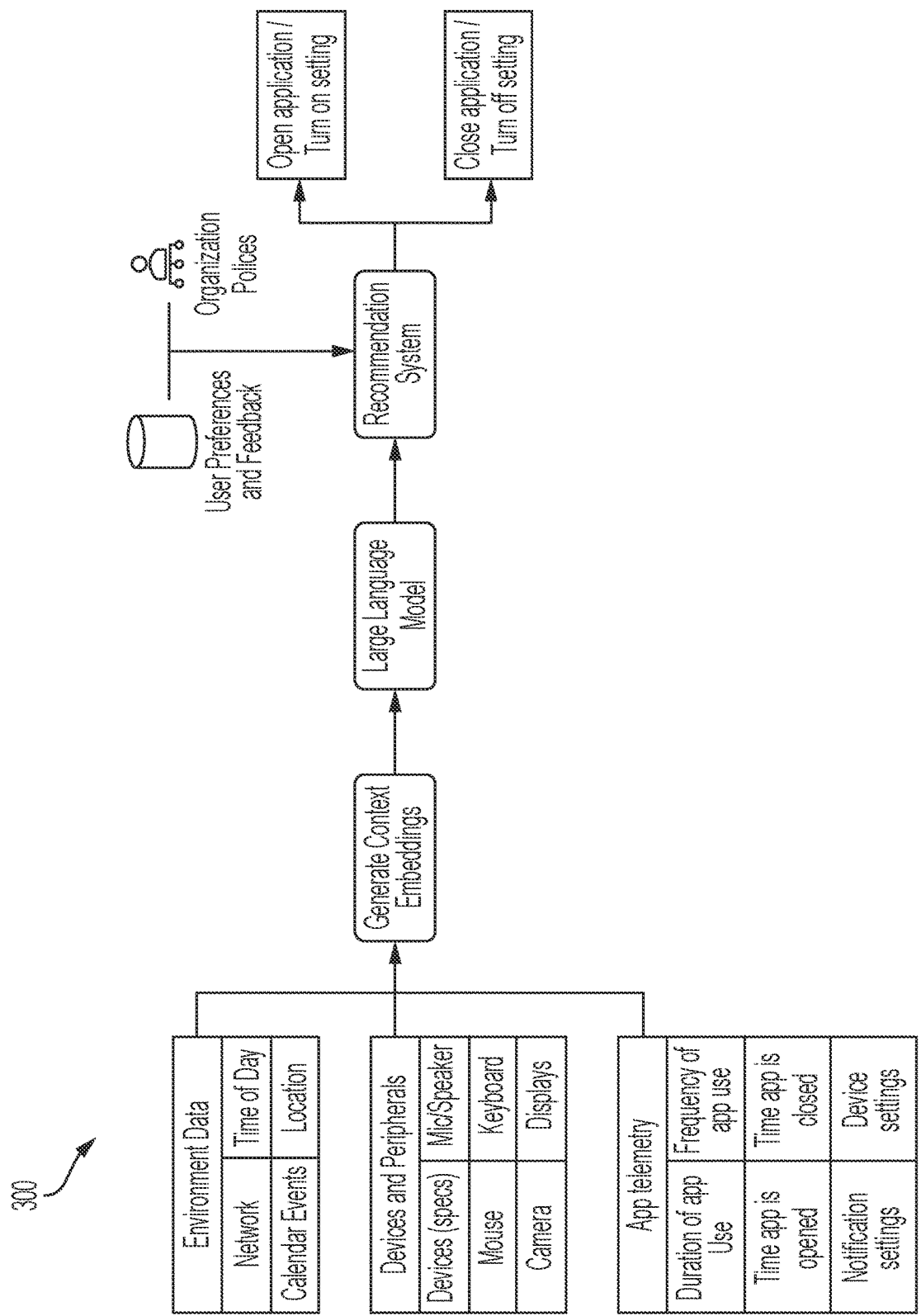
FIG. 3 is an operational flow diagram illustrating an implementation of a system configured to reconfigure a virtual workspace based on context data that utilizes a large language model (LLM) according to some embodiments of the disclosure.

A system 300 for executing the flow chart of FIG. 1 using a large language model (LLM) is shown in FIG. 3. Specifically, in some embodiments, an LLM may receive context data in the form of one or more context embeddings and the probability values for each configuration setting may be determined based on those encoded inputs. In some embodiments, an embedding model (e.g., Word2Vec) may receive the context data (e.g., in the form of one or more feature vectors) to generate context embeddings to be received by the LLM. Moreover, a recommendation system may modify the probability values determined by the LLM based on preference settings (e.g., user preferences/feedback, organizational settings) to generate modified probability values to compare against two or more probability thresholds.

As described with regards to systems 200 and 300, machine learning models may be used to determine probability values associated with configuration settings based on context data. Machine learning models may also be used to modify probability values based on preference settings, determine preference settings based on user habits (e.g., historical context data), determine probability thresholds, or a combination thereof. Machine learning models, such as an SVP as described with regards to system 200 or an LLM as described with regards to system 300, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received context data, and a system, such as an environment or particular user, and/or a degree to which such an influencing attribute affects the outcome of such a system (e.g., determination of environment or user preferences).

Figure 4:
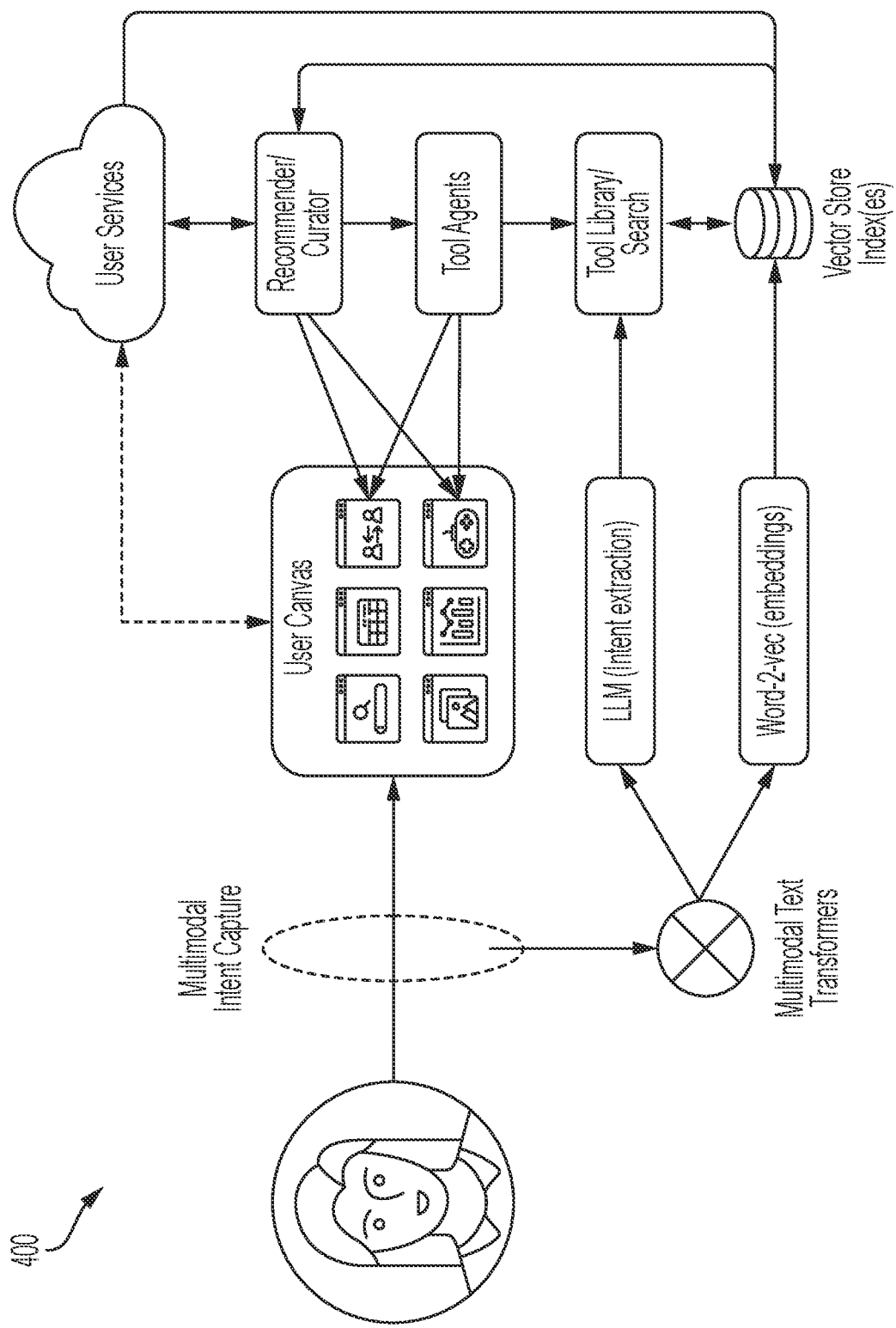
FIG. 4 is an operational flow diagram illustrating an alternative implementation of a system configured to reconfigure a virtual workspace based on context data that utilizes a large language model (LLM) according to some embodiments of the disclosure.

FIG. 4 is a block diagram illustrating a system 400 for executing the flow chart of FIG. 1. As shown in system 400, in some embodiments, as a user interacts with a virtual user canvas (i.e., virtual workspace), context data based on the user's interactions may be collected via multimodal intent capture and that context data maybe be converted into forms receivable by an embedding model (e.g., Word2Vec) and an LLM. The LLM may access and search a tool library (i.e., library of applications and/or virtual workspace interface settings) in order to reference configurations settings for which probability values may be determined. A recommender/curator may access the tools (i.e., applications/ virtual workspace interface settings) and their associated probability values determined by the LLM, modify the probability values based on user settings (i.e., preference settings), and then reconfigure the user canvas (e.g., open/ close applications, display/hide applications, rearrange application interfaces/widgets, toggle on/off virtual workspace interface settings) based on those modified probability values.

Figure 5:
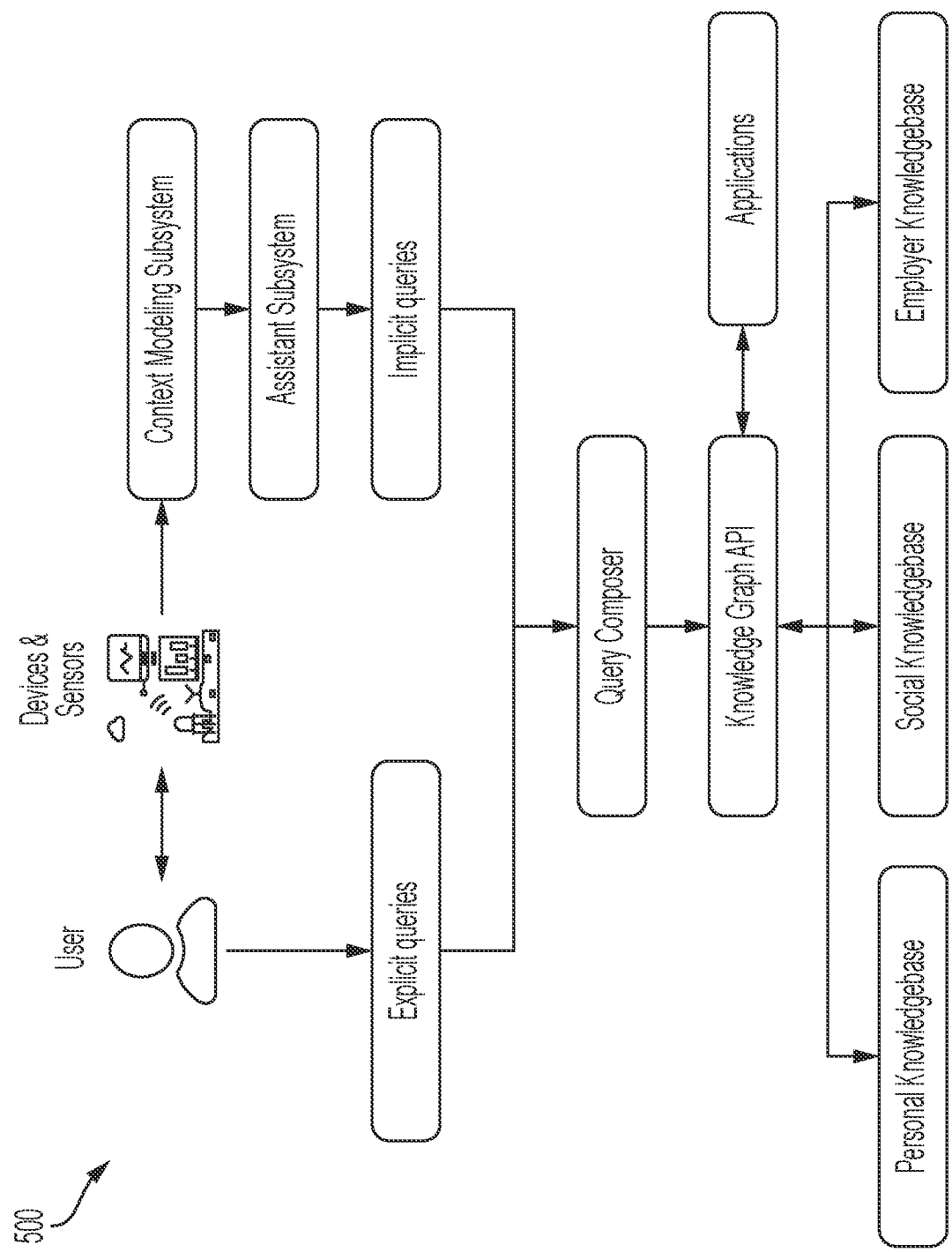
FIG. 5 is an operational flow diagram illustrating an implementation of a system configured to reconfigure a virtual workspace based on context data that utilizes a knowledge graph application programming interface (API) according to some embodiments of the disclosure.

FIG. 5 is a block diagram illustrating a system 500 for executing the flow chart of FIG. 1. As shown in system 500, in some embodiments, queries for specific reconfigurations of a virtual workspace may be generated by a query composer. Queries may be explicit (i.e., specifically requested by the user) or implicit (i.e., formulated based on context data received and organized by a context modeling subsystem. Additionally, as shown in system 500, a knowledge graph application programming interface (API) may be used to assist with determining/modifying probability values for configuration settings and also for reconfiguring (e.g., opening/closing, hiding/displaying) of applications based on the probability values by allowing for interfacing with the applications themselves as well as with personal knowledge base(s) (e.g., use habits of a particular user, user preferences/feedback, historical context data for a particular user), social knowledge base(s) (e.g., use habits of a typical user), and employer knowledge bases (e.g., organizational policies, use habits of typical employees within the user's organization).

Figure 6:
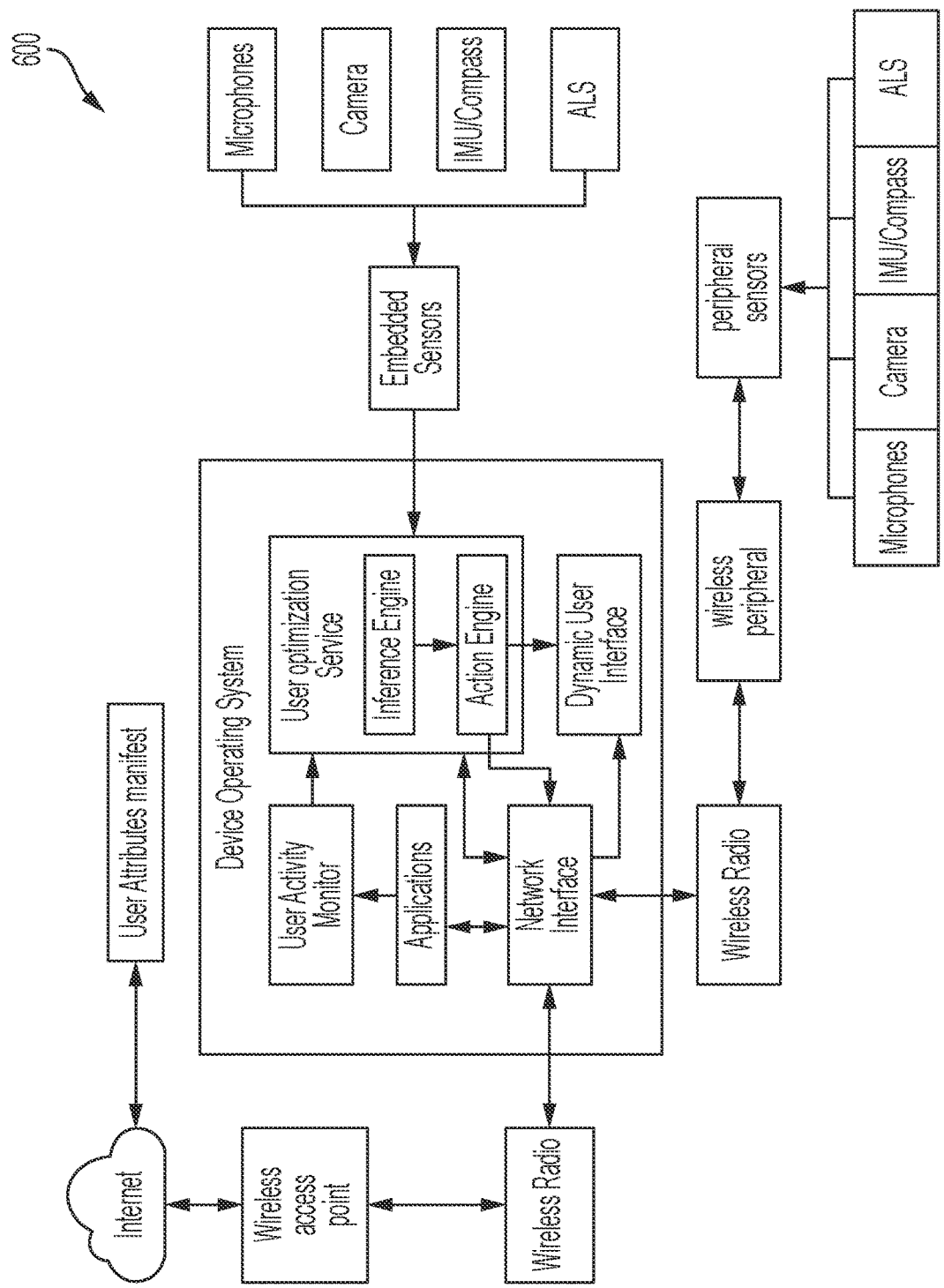
FIG. 6 is a schematic block diagram illustrating an implementation of an information handling system configured to reconfigure a virtual workspace based on context data according to some embodiments of the disclosure.

FIG. 6 is a block diagram illustrating an information handling system 500 configured for executing the flow chart of FIG. 1. As shown in system 600, in some embodiments, an information handling system may be configured to run an operating system configured to implement method 100. For example, an operating system may monitor user activity relating to applications to receive context data, utilize an inference engine to determine/modify probability values for configuration settings based on context data, and utilize an action engine to compare probability values to probability thresholds and activate/deactivate configuration settings based on the comparisons to reconfigure a dynamic user interface (i.e., virtual workspace). Additionally, the operating system may interface with peripheral sensors and or embedded sensors to receive context data from peripheral devices and may interface with the internet to access user attributes which the inference engine may interpret to determine preference settings (e.g., user preferences/feedback) and/or personal use habits (e.g., historical context data).

Figure 7:
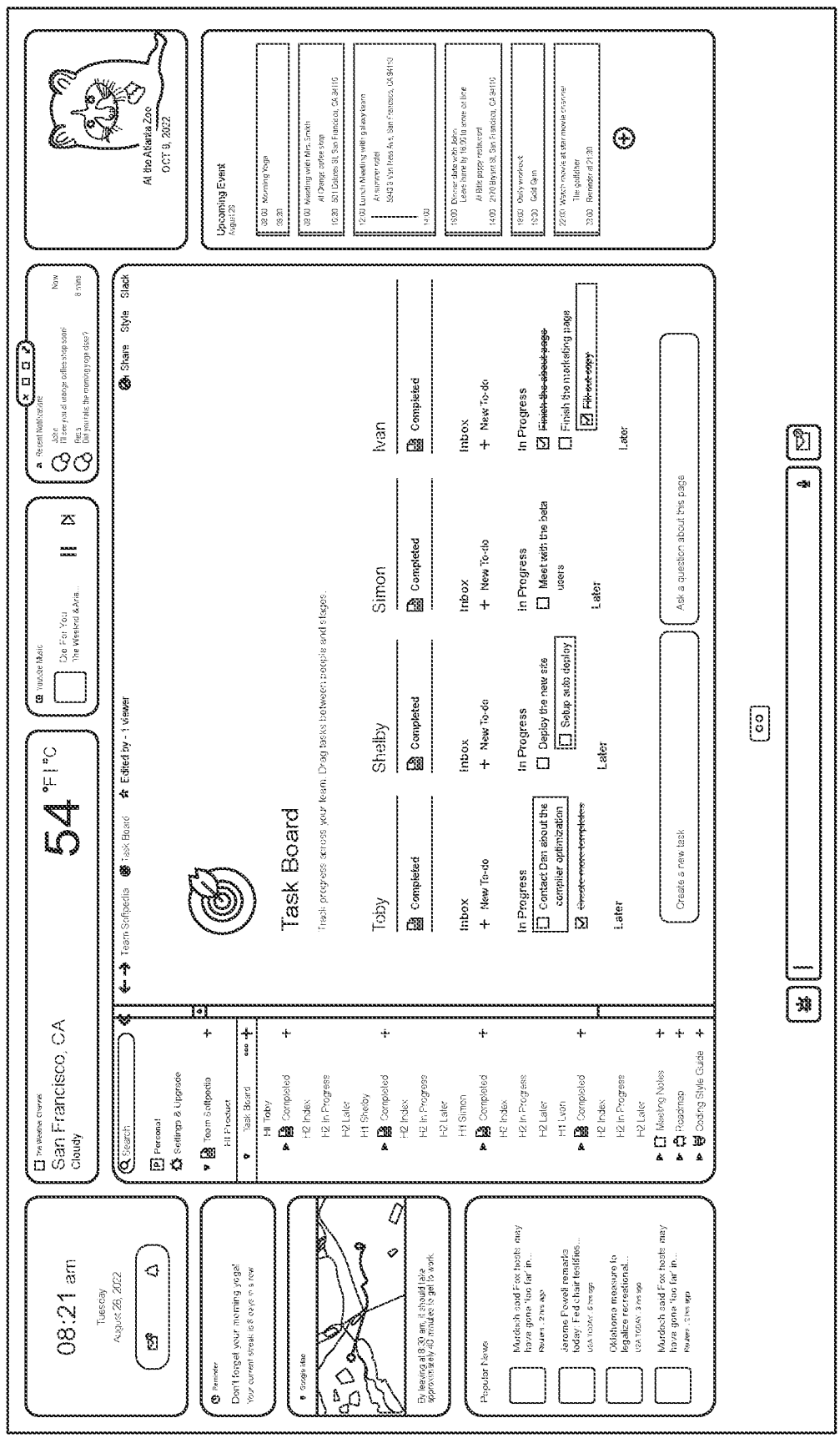
FIG. 7 is a graphic that illustrates an example of a virtual workspace according to some embodiments of the disclosure.

FIG. 7 illustrates an example virtual workspace in accordance with embodiments of the present disclosure. As shown in FIG. 7, the virtual workspace may include one or more widgets associated with one or more applications. The widgets may be one or more sizes and/or shapes. Also, the widgets may display a portion of information related to the application(s) associated with the widget. Additionally, the widgets may be configured such that the user may interact with the application by way of interacting with the widget (e.g., checking a task as complete on the task board, entering a query in the browser search bar).

These example embodiments describe and illustrate various systems and methods for reconfiguring a virtual workspace based on context data by an information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 8.

Figure 8:
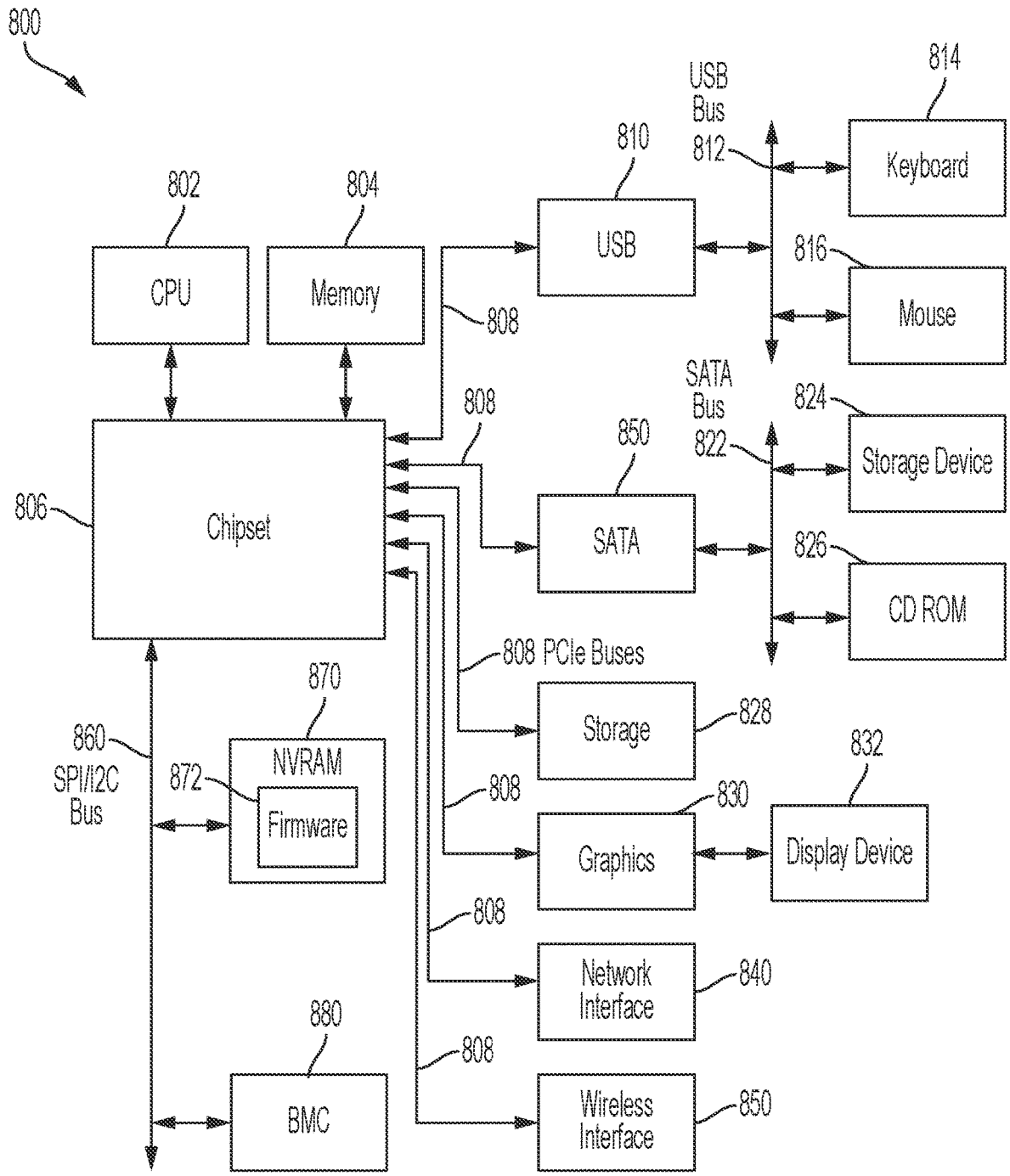
FIG. 8 is a schematic block diagram of an example information handling system according to some embodiments of the disclosure.

FIG. 8 illustrates an example information handling system 800. Information handling system 800 may include a processor 802 (e.g., a central processing unit (CPU)), a memory (e.g., a dynamic random-access memory (DRAM)) 804, and a chipset 806. In some embodiments, one or more of the processor 802, the memory 804, and the chipset 806 may be included on a motherboard (also referred to as a mainboard), which is a printed circuit board (PCB) with embedded conductors organized as transmission lines between the processor 802, the memory 804, the chipset 806, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 802, the memory 804, the chipset 806, and/or other components may be organized as a System on Chip (SoC).

The processor 802 may execute program code by accessing instructions loaded into memory 804 from a storage device, executing the instructions to operate on data also loaded into memory 804 from a storage device, and generate output data that is stored back into memory 804 or sent to another component. The processor 802 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 802 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 806 may facilitate the transfer of data between the processor 802, the memory 804, and other components. In some embodiments, chipset 806 may include two or more integrated circuits (ICs), such as a northbridge controller coupled to the processor 802, the memory 804, and a southbridge controller, with the southbridge controller coupled to the other components such as USB 810, SATA 820, and PCIe buses 808. The chipset 806 may couple to other components through one or more PCIe buses 808.

Some components may be coupled to one bus line of the PCIe buses 808, whereas some components may be coupled to more than one bus line of the PCIe buses 808. One example component is a universal serial bus (USB) controller 810, which interfaces the chipset 806 to a USB bus 812. A USB bus 812 may couple input/output components such as a keyboard 814 and a mouse 816, but also other components such as USB flash drives, or another information handling system. Another example component is a SATA bus controller 820, which couples the chipset 806 to a SATA bus 822. The SATA bus 822 may facilitate efficient transfer of data between the chipset 806 and components coupled to the chipset 806 and a storage device 824 (e.g., a hard disk drive (HDD) or solid-state disk drive (SDD)) and/or a compact disc read-only memory (CD-ROM) 826. The PCIe bus 808 may also couple the chipset 806 directly to a storage device 828 (e.g., a solid-state disk drive (SDD)). A further example of an example component is a graphics device 830 (e.g., a graphics processing unit (GPU)) for generating output to a display device 832, a network interface controller (NIC) 840, and/or a wireless interface 850 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 806 may also be coupled to a serial peripheral interface (SPI) and/or Inter-Integrated Circuit (I2C) bus 860, which couples the chipset 806 to system management components. For example, a non-volatile random-access memory (NVRAM) 870 for storing firmware 872 may be coupled to the bus 860. As another example, a controller, such as a baseboard management controller (BMC) 880, may be coupled to the chipset 806 through the bus 860. BMC 880 may be referred to as a service processor or embedded controller (EC). Capabilities and functions provided by BMC 880 may vary considerably based on the type of information handling system. For example, the term baseboard management system may be used to describe an embedded processor included at a server, while an embedded controller may be found in a consumer-level device. As disclosed herein, BMC 880 represents a processing device different from processor 802, which provides various management functions for information handling system 800. For example, an embedded controller may be responsible for power management, cooling management, and the like. An embedded controller included at a data storage system may be referred to as a storage enclosure processor or a chassis processor.

System 800 may include additional processors that are configured to provide localized or specific control functions, such as a battery management controller. Bus 860 can include one or more busses, including a Serial Peripheral Interface (SPI) bus, an Inter-Integrated Circuit (I2C) bus, a system management bus (SMBUS), a power management bus (PMBUS), or the like. BMC 880 may be configured to provide out-of-band access to devices at information handling system 800. Out-of-band access in the context of the bus 860 may refer to operations performed prior to execution of firmware 872 by processor 802 to initialize operation of system 800.

Firmware 872 may include instructions executable by processor 102 to initialize and test the hardware components of system 800. For example, the instructions may cause the processor 802 to execute a power-on self-test (POST). The instructions may further cause the processor 802 to load a boot loader or an operating system (OS) from a mass storage device. Firmware 872 additionally may provide an abstraction layer for the hardware, such as a consistent way for application programs and operating systems to interact with the keyboard, display, and other input/output devices. When power is first applied to information handling system 800, the system may begin a sequence of initialization procedures, such as a boot procedure or a secure boot procedure. During the initialization sequence, also referred to as a boot sequence, components of system 800 may be configured and enabled for operation and device drivers may be installed. Device drivers may provide an interface through which other components of the system 800 can communicate with a corresponding device. The firmware 872 may include a basic input-output system (BIOS) and/or include a unified extensible firmware interface (UEFI). Firmware 872 may also include one or more firmware modules of the information handling system. Additionally, configuration settings for the firmware 872 and firmware of the information handling system 800 may be stored in the NVRAM 870. NVRAM 870 may, for example, be a non-volatile firmware memory of the information handling system 800 and may store a firmware memory map namespace 800 of the information handling system. NVRAM 870 may further store one or more container-specific firmware memory map namespaces for one or more containers concurrently executed by the information handling system.

Information handling system 800 may include additional components and additional busses, not shown for clarity. For example, system 800 may include multiple processor cores (either within processor 802 or separately coupled to the chipset 806 or through the PCIe buses 808), audio devices (such as may be coupled to the chipset 806 through one of the PCIe busses 808), or the like. While a particular arrangement of bus technologies and interconnections is illustrated for the purpose of example, one of skill will appreciate that the techniques disclosed herein are applicable to other system architectures. System 800 may include multiple processors and/or redundant bus controllers. In some embodiments, one or more components may be integrated together in an integrated circuit (IC), which is circuitry built on a common substrate. For example, portions of chipset 806 can be integrated within processor 802. Additional components of information handling system 800 may include one or more storage devices that may store machine-executable code, one or more communications ports for communicating with external devices, and various input and output (I/O) devices, such as a keyboard, a mouse, and a video display.

In some embodiments, processor 802 may include multiple processors, such as multiple processing cores for parallel processing by the information handling system 800. For example, the information handling system 800 may include a server comprising multiple processors for parallel processing. In some embodiments, the information handling system 800 may support virtual machine (VM) operation, with multiple virtualized instances of one or more operating systems executed in parallel by the information handling system 800. For example, resources, such as processors or processing cores of the information handling system may be assigned to multiple containerized instances of one or more operating systems of the information handling system 800 executed in parallel. A container may, for example, be a virtual machine executed by the information handling system 800 for execution of an instance of an operating system by the information handling system 800. Thus, for example, multiple users may remotely connect to the information handling system 800, such as in a cloud computing configuration, to utilize resources of the information handling system 800, such as memory, processors, and other hardware, firmware, and software capabilities of the information handling system 800. Parallel execution of multiple containers by the information handling system 800 may allow the information handling system 800 to execute tasks for multiple users in parallel secure virtual environments.

The schematic flow chart diagram of FIG. 1 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by an information handling system, context data comprising an accessed network type and application telemetry data pertaining to a virtual workspace, wherein the accessed network type comprises a personal network. a work network, or a public network; and
   reconfiguring, by the information handling system, the virtual workspace, the reconfiguring comprising:
      determining, by the information handling system, a plurality of probability values each associated with a configuration setting of a plurality of configuration settings of the virtual workspace, wherein each of the plurality of probability values represents a likelihood that the associated configuration setting should be active based on the context data;
      modifying, by the information handling system, the plurality of probability values based on one or more preference settings and the accessed network type to generate a plurality of modified probability values;
      comparing, by the information handling system, each of the plurality of modified probability values associated with configuration settings of the plurality of configuration settings that are presently inactive to a first probability threshold;
      comparing, by the information handling system, each of the plurality of modified probability values associated with configuration settings of the plurality of configuration settings that are presently active to a second probability threshold that is lesser in magnitude than the first probability threshold;
      activating, by the information handling system, the configuration settings that are presently inactive that are also associated with probability values of the plurality of modified probability values that are greater than the first probability threshold, wherein the configuration settings comprise muting notifications from an application and toggling on or off virtual workspace interface settings based on the accessed network type and the application telemetry data; and
      deactivating, by the information handling system, the configuration settings that are presently active that are also associated with probability values of the plurality of modified probability values that are less than the second probability threshold.

2. The method of claim 1, wherein the determining is performed using a classification algorithm that receives the context data as one or more feature vectors.

3. The method of claim 2, wherein the classification algorithm is implemented using a support vector machine (SVM).

4. The method of claim 1, wherein the determining is performed using a large language model (LLM) that receives the context data as one or more context embeddings.

5. The method of claim 1, wherein activating the configuration settings comprises opening one or more applications, and wherein deactivating the configuration settings comprises closing one or more applications.

6. The method of claim 1, wherein the reconfiguring is performed in response to one or more discrete events without direct prompting by a user.

7. The method of claim 6, wherein the one or more discrete events are defined based on a time of day.

8. The method of claim 6, wherein the one or more discrete events are defined based on one or more entries in a virtual calendar.

9. The method of claim 1, wherein the context data comprises environment data, device data, peripheral data, or a combination thereof.

10. An information handling system, comprising:
a display configured to display a virtual workspace;
a memory; and
at least one processor, wherein the processor is configured to perform the steps comprising:
receiving context data comprising an accessed network type and application telemetry data pertaining to a virtual workspace, wherein the accessed network type comprises a personal network, a work network, or a public network; and
reconfiguring the virtual workspace, the reconfiguring comprising:
determining a plurality of probability values each associated with a configuration setting of a plurality of configuration settings of the virtual workspace, wherein each of the plurality of probability values represents a likelihood that the associated configuration setting should be active based on the context data;
modifying the plurality of probability values based on one or more preference settings and the accessed network type to generate a plurality of modified probability values;
comparing each of the plurality of modified probability values associated with configuration settings of the plurality of configuration settings that are presently inactive to a first probability threshold;
comparing each of the plurality of modified probability values associated with configuration settings of the plurality of configuration settings that are presently active to a second probability threshold that is lesser in magnitude than the first probability threshold;
activating the configuration settings that are presently inactive that are also associated with probability values of the plurality of modified probability values that are greater than the first probability threshold, wherein the configuration settings comprise muting notifications from an application and toggling on or off virtual workspace interface settings based on the accessed network type and the application telemetry data; and
deactivating the configuration settings that are presently active that are also associated with probability values of the plurality of modified probability values that are less than the second probability threshold.

11. The information handling system of claim 10, wherein the determining is performed using a classification algorithm that receives the context data as one or more feature vectors.

12. The information handling system of claim 11, wherein the classification algorithm is implemented using a support vector machine (SVM).

13. The information handling system of claim 10, wherein the determining is performed using a large language model (LLM) that receives the context data as one or more context embeddings.

14. The information handling system of claim 10, wherein activating the configuration settings comprises opening one or more applications, and wherein deactivating the configuration settings comprises closing one or more applications.

15. A computer product, comprising:
a non-transitory computer readable medium comprising instructions to perform steps comprising:
receiving context data comprising an accessed network type and application telemetry data pertaining to a virtual workspace, wherein the accessed network type comprises a personal network, a work network, or a public network; and
reconfiguring the virtual workspace, the reconfiguring comprising:
determining a plurality of probability values each associated with a configuration setting of a plurality of configuration settings of the virtual workspace, wherein each of the plurality of probability values represents a likelihood that the associated configuration setting should be active based on the context data;
modifying the plurality of probability values based on one or more preference settings and the accessed network type to generate a plurality of modified probability values;
comparing each of the plurality of modified probability values associated with configuration settings of the plurality of configuration settings that are presently inactive to a first probability threshold;
comparing each of the plurality of modified probability values associated with configuration settings of the plurality of configuration settings that are presently active to a second probability threshold that is lesser in magnitude than the first probability threshold;
activating the configuration settings that are presently inactive that are also associated with probability values of the plurality of modified probability values that are greater than the first probability threshold, wherein the configuration settings comprise muting notifications from an application and toggling on or off virtual workspace interface settings based on the accessed network type and the application telemetry data; and
deactivating the configuration settings that are presently active that are also associated with probability values of the plurality of modified probability values that are less than the second probability threshold.

16. The computer product of claim 15, wherein the reconfiguring is performed in response to one or more discrete events without direct prompting by a user.

17. The computer product of claim 16, wherein the one or more discrete events are defined based on a time of day.

18. The computer product of claim 16, wherein the one or more discrete events are defined based on one or more entries in a virtual calendar.

19. The computer product of claim 15, wherein the context data comprises environment data, device data, peripheral data, or a combination thereof.

20. The computer product of claim 15, wherein the determining is performed using a large language model (LLM) that receives the context data as one or more context embeddings.

* * * * *